Jan. 1, 1957     H. KRAUSE     2,776,160
AUTOMOBILE HOOD LATCH
Filed Aug. 31, 1953     2 Sheets-Sheet 1
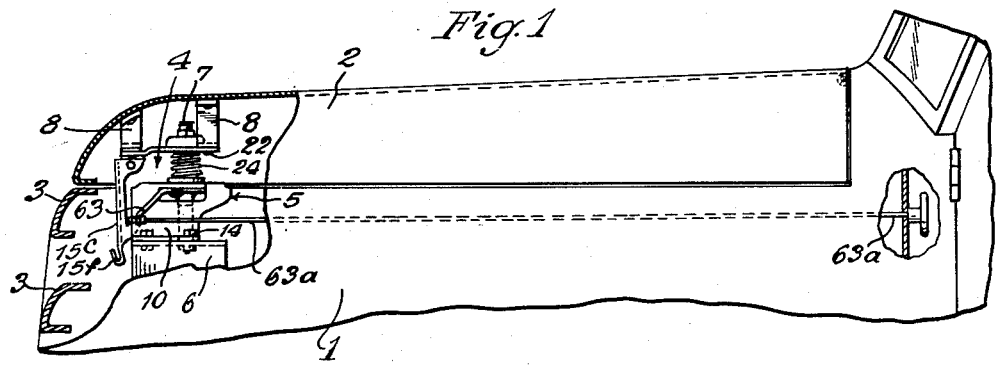
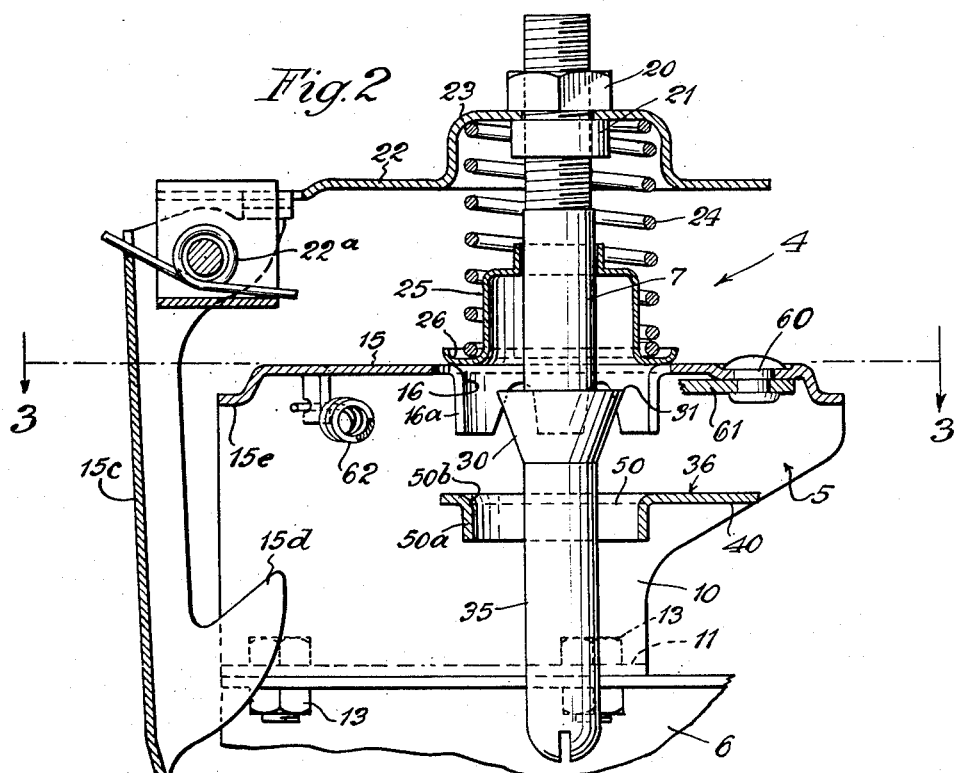
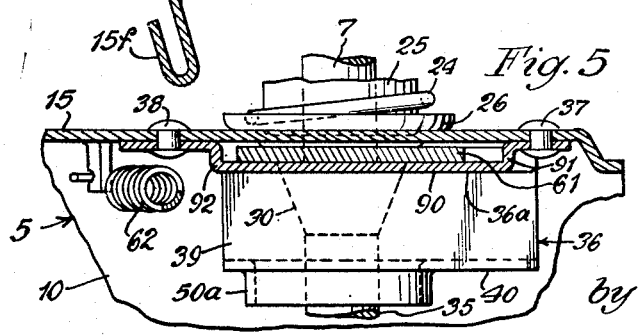
Inventor
Herbert Krause
by Parker & Carter
Attorneys Jan. 1, 1957  H. KRAUSE  2,776,160
AUTOMOBILE HOOD LATCH
Filed Aug. 31, 1953  2 Sheets-Sheet 2

Inventor
Herbert Krause
by Parker & Carter
Attorneys

United States Patent Office 2,776,160
Patented Jan. 1, 1957

---

2,776,160

AUTOMOBILE HOOD LATCH

Herbert Krause, Chicago, Ill., assignor to Chicago Forging and Manufacturing Company, Chicago, Ill., a corporation of Delaware Application August 31, 1953, Serial No. 377,319

3 Claims. (Cl. 292—304)

This invention is related to the art of automobile hood latches.

One object of this invention is to provide a latch and keeper assembly so formed and constructed as to guide the keeper, when the members to be latched approach each other, in such manner as to insure the entrance of the keeper into proper position for engagement with the latch, even though the various components of the assembly may have moved out of their initial position due to wear or other circumstances.

For a further understanding of the invention, reference may be had to the accompanying drawings, wherein:

Figure 1 is a diagrammatic showing of an automobile hood enclosure therefor with hood portions broken away to show the latch invention in operative position;

Figure 2 is a side view, in partial cross section, on an enlarged scale of the latch shown in Figure 1;

Figure 5 is a detailed view taken on the line 5—5 of Figure 3.

Figure 4:
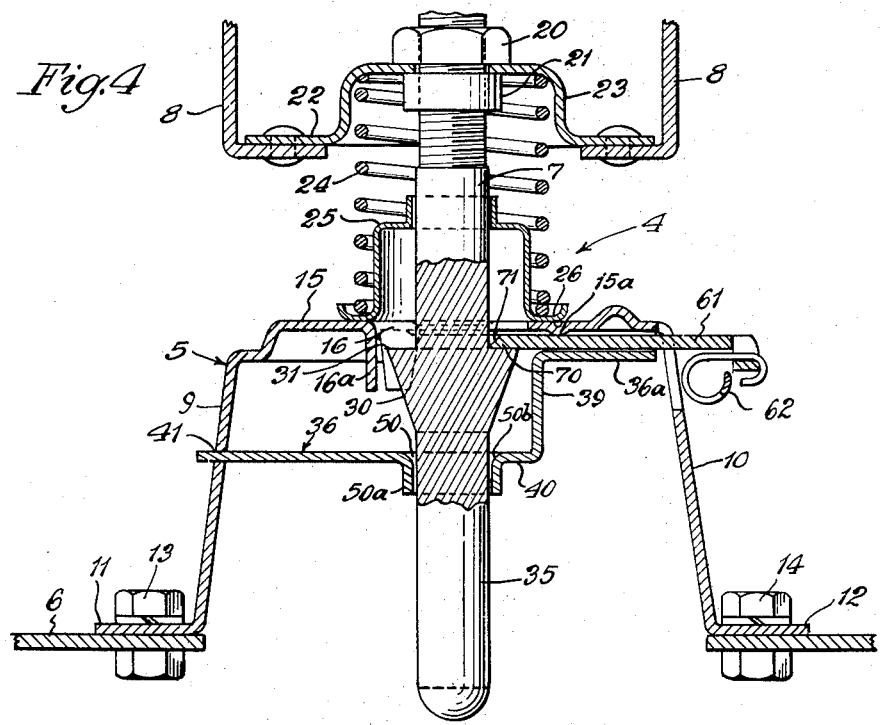
Figure 4 is a front view of the latch shown in partial cross section of the latch shown in Figure 2.

Referring now to the drawings, wherein like figures are designated by like characters throughout, and particularly to Figure 1, an automobile forward body portion is generally designated by the numeral 1. The portion 1 is provided with the usual hood member 2 of the alligator type. Hood member 2 is adapted to be swung about hinge members interconnected with the hood and body member to allow the lefthand end of the hood member shown in Figure 1 to be swung upwardly. The customary grill members of the automobile proper are indicated by the numeral 3. 4 generally indicates the improved latching device of this invention which includes a keeper and latch assembly wherein the keeper is adapted to be mounted on one member of the hood-body assembly and the latch is adapted to be mounted on the other.

Referring now to Figures 2 and 4, a latch support member 5 is mounted upon a transversely extending supporting element 6 of the body portion 1. 7 generally indicates a keeper which may be vertically mounted upon a transversely extending supporting element 8 of the hood. The latch support member 5, which may be formed of sheet metal, is generally U-shaped in form as will be best seen in Figure 4. It includes depending wall members 9 and 10 that extend generally in a fore and aft direction with respect to the automobile, and attaching flange members 11 and 12 adapted to receive a simple connecting means such as the bolt and nut assembly 13—14, for connection to the supporting element 6. The latch support 5 includes a generally horizontal top portion 15 spaced upwardly from the supporting element 6. The walls 9 and 10, an upper portion 15 and flanges 11 and 12 are preferably integrally formed. The upper plate member 15 is provided with a generally centrally located aperture 16, best seen in Figure 3, which is adapted to receive portions of the keeper 7. 16a indicates wall portions or abutments depending from a segment of the perimeter of the aperture 16.

The keeper 7 has its upper end threatened for attachment, by means of the nuts 20—21, to a keeper-supporting plate member 22. The plate member 22 has formed integrally therewith a socket 23 to the center of which is attached the upper end of the keeper 7. The socket 23 forms a housing for one end of the spring means 24 which surrounds the shaft of the keeper 7. Slidably mounted on the keeper 7 is a retaining member 25 having an outer annular end flange 26 adapted to retain the other end of the spring 24. Pivotally mounted on the plate 22, forward of the keeper 7, is a safety latch 15c having a hook portion 15d positioned for automatic engagement, in response to urging of the spring 22a positioned between the safety latch 15c and the keeper support 22, with an offset portion 15e of the latch support base member and for disengagement therefrom through manual movement of a safety latch handle portion 15f.

The keeper 7 has a spearhead portion 30 sufficiently spaced from the keeper supporting plate 22 to permit entry of said spearhead portion into and through the aperture 16. A spearhead 30 has an annular portion 31 forming a latching or latch-engaging shelf. The walls of the spearhead 30 converge downwardly and inwardly from the annular portion 31 to the cylindrical wall of the keeper 7. Extending beyond the spearhead 30 is a dovetailing member 35, constituting, in effect, an extension of the keeper 7.

As the closure member is brought downwardly toward the hood 1 the dovetailing extension passes first through the aperture 16. Arranged below the upper portion 15 of the support 5 is a plate member 36 which may be secured to the upper plate portion 15 as by the rivets 37—38 shown in Figure 5. The rivets 37—38 secure an upper flange portion 36a of the plate 36. The plate includes a portion 39 downwardly depending from said upper flange and a horizontally extending portion 40 which may extend a sufficient distance between the walls 9 and 10 to contact and extend through the wall 9 as at 41 for ease in manufacture, assembly and adjustment. Thus it will be seen that the horizontal portion 40 of the plate 36 underlies the aperture 16. An elongated aperture 50 is formed in the plate 36 in alignment with the aperture 16. The sides of the aperture 50 are rounded as at 50b and guide walls 50a extend downwardly from the perimeter of the aperture. The length of the aperture 50 is substantially equal to that of the aperture 16, but the width of the aperture 50 is substantially less than the width of the aperture 16 and is in fact only slightly greater than the diameter of the dovetail keeper extension portion 35, as will be seen in Figure 4.

Figure 3:
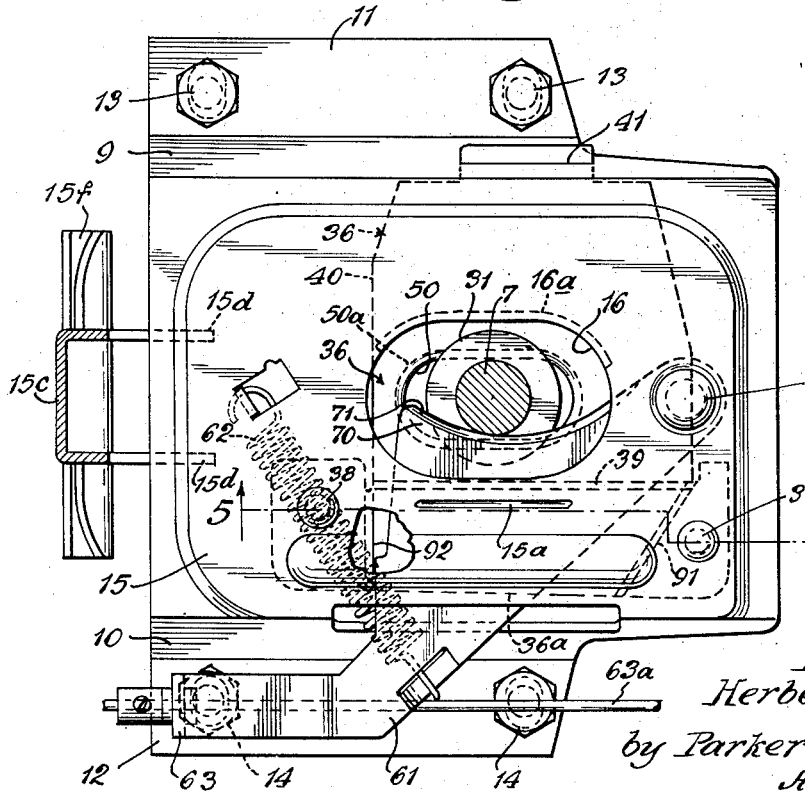
Figure 3 is a sectional view of the latch shown in Figure 2 taken along the section lines 3—3 of Figure 2.

Pivotally mounted, as at 60, to the upper portion 15 of the latch support 5 is a latch bolt member 61. A spring 62 is connected to the latch member 61 and to the plate portion 15 to bias the latch 61 into latching position. The latch member 61 has an operating extension 63 extending outside the plate support 5 and connected with an operating shaft 63a which may be manually controlled from the inside of an automobile. The latch member 61 has a keeper-engaging portion 70 which, under the influence of the spring 62 is caused to extend a substantial distance into the aperture 16, as best illustrated in Figure 3. The latch portion 70 has its keeper-contacting edge downwardly chamfered as at 71 to provide a smooth engagement with the upwardly expanding wall portion of the spearhead 30 as the keeper passes through the aperture 16.

As best seen in Figures 4 and 5, the latch 61 is pivoted to the underside of the horizontal plate portion 15 of the latch base 5, the pivot 60 being generally in alignment, longitudinally of the plate portion 15, with the aperture 16. A downwardly latch-abutting element 15a may be created by offsetting a portion of the plate 15. It will be realized that the top surface of the latch 61 rides along the element 15a during its movement into and out of latching position.

The flange 36a on the plate 36 has a shelf 90 downwardly offset as at 91—92 from the flange portions which are secured by the rivets 37—38, as best seen in Figure 5. The shelf 90 is arranged below and parallel with the plate 15 and latch abutting element 15a to form therewith a channel or guide means for the latch 61. The offsets 91—92 thus serve as limit stops for the latch 61 and establish its latching and unlatching positions. Since the latch 61 is generally triangular in shape, the offset 91 is similarly angularly positioned. In Figure 3 it will be noted that the latch bolt is limited in movement to a position spaced from the axis of the apertures 16 and 50 by a distance on the order of the radius of the extension 35.

It will be realized that whereas I have described and illustrated a practical and operative device, nevertheless, many changes may be made in the size, shape, number and disposition of parts without departing from the spirit of my invention. I, therefore, wish my description and drawings to be taken as in a broad sense illustrative or diagrammatic, rather than as limiting me to my precise showing.

The use and operation of my invention are as follows:

I provide a latch and keeper assembly effective to securely latch a hood to an automobile. Whereas I show the keeper attached to the hood and the latch to the body it will be realized that these elements could be reversed without departing from the nature and scope of my invention.

As the hood approaches the body during the closing operation, it is important that the spearhead portion 30 be centered with relation to the aperture 16 and that it be enabled to pass through the aperture 16 a sufficient distance to permit the latch-edge portion 70 to snap into contact with the keeper shaft 7 above the latching shelf formed by the annular portion 31 of the spearhead 30. It is well known that closure members and hood members of automobiles tend to become misaligned due to wear, vibration and other circumstances as the life of the automobile continues. The annular portion 31 of the spearhead 30 is of insufficient linear extension along the axis of the keeper to provide a substantial guidance. I therefore provide a dovetailing or guiding extension 35 on the keeper 7. After the dovetailing portion 35 passes through the aperture 16 it is engaged by the plate 36 and passes through the aperture 50 therein. It will be noted that the aperture 50 has downwardly depending guiding walls 50a and that the upper edge of the aperture 50 is rounded as at 50b. Since the hood approaches the body at an acute angle both apertures 16 and 50 are elongated along the longitudinal axis of the hood. The aperture 16 must be substantially wider than the shaft of the keeper 7 in order to permit the passage therethrough of the enlarged cylindrical portion 31 of the spearhead 30. The aperture 50, however, is sufficiently spaced from the plate 15 so as to permit the spearhead to come to rest between the plate 15 and the plate 36 and the aperture 50 need only be laterally wide enough barely to permit the passage therethrough of the dovetail keeper extension 35. Since one end of the plate 36 is merely in loose slidable engagement with the base 5, as at 41, it is free to move slightly in adjustment or in response to contact of the keeper guide means 35 with the rounded edge 50b of the aperture 50.

As the hood member is brought downwardly toward the body the spring 24 is compressed between the plate 15 and the hood member plate 22 to a point sufficient to permit the spearhead 30 to pass below the latch 61. After the keeper engaging edge 70 of the latch 61 has snapped into place above the latch-engaging shelf 31 of the keeper the spring 24 tends to hold the shelf 31 upwardly against the latch 61 and thus to retain the body and hood members securely in relation one to the other. Depending walls 16a are abutted by the cylinder portion 31 of the spearhead 30 at a point diametrically across the spearhead from the latch-edge 70 to keep the keeper 7 from moving, for example to the left in Figure 4, in response to the urging of the edge 70 under influence of the spring 62. When it is desired to again separate the hood from the body it is necessary only for the operator to slide the latch member 61 outwardly against the action of the spring 62 sufficiently to cause the keeper engaging edge 70 no longer to overlie the spearhead shelf 31. As this happens the spring 24 is effective rapidly to cause the entire keeper 7 and the spearhead 30 to move upwardly through the aperture 16 and away from the upper latch support portion 15. As the spearhead 30 and extension 35 leave the aperture 16 the latch-engaging edge 70 of the latch 61 returns, under the influence of the spring 62, to keeper receiving position.

I claim:

1. In an automobile latch assembly for automobile hoods and the like, a latch base having an aperture therein, a latch bolt pivotally mounted on said base and yieldingly biased to extend inwardly into said aperture, an elongated keeper formed and adapted to penetrate said aperture when said keeper and said base are moved toward each other, said keeper having a latch bolt engaging enlargement intermediate its ends, said keeper having a guide extension of substantial length and generally uniform cross sectional area extending outwardly from said enlargement, said assembly including a plate member spaced from said base and having an aperture positioned in alignment with said base aperture, said plate aperture being formed and adapted to receive said guide extension, said enlargement having a latch bolt engaging surface extending further from the axis of said keeper than the surface of said guide extension in the direction of said latch bolt, said plate aperture having a width substantially equal to the lateral dimension of said guide extension but less than the width of the aperture in said latch base and less than the lateral dimension of said enlargement, said guide extension extending a substantial distance beyond said plate member when said latch bolt is engaged with said enlargement whereby said keeper is constrained by said plate member during movement of said base and keeper toward and away from one another.

2. In a latch assembly, a latch plate having a keeper receiving aperture therein, a latch bolt pivotally mounted on said plate for movement into and out of alignment with a portion of said aperture, a guide plate secured to said latch plate and spaced therefrom, said guide plate having an aperture therein in axial alignment with the aperture in said latch plate, a keeper comprising an elongated pin, a generally frusto-conical, outwardly converging enlargement on said keeper, said enlargement being positioned intermediate the ends of said keeper, an elongated generally cylindrical guide extension on the keeper outwardly of said enlargement, said guide extension having a diameter only slightly less than the width of said guide plate aperture, said enlargement being receivable in the latch plate aperture and engageable with said latch, the diameter of said guide extension being substantially less than the maximum diameter of said enlargement, said guide plate being spaced from said latch plate a distance greater than the length of said enlargement, said keeper guide extension having a length greater than the spacing between said latch plate and said guide plate whereby said guide extension may enter said guide plate aperture prior to the entry of said enlargement into said latch plate aperture, and means for limiting movement of said latch bolt into alignment with a portion of said aperture to a position spaced from the axis of said apertures by a distance generally equal to the radius of the cylindrical guide extension.

3. In an automobile hood latch assembly, a latch supporting base, a keeper, an aperture in said base and an enlargement on said keeper adapted to penetrate said aperture, a latch bolt slidably mounted on said base and yieldingly biased to extend inwardly into said aperture for a distance sufficient to be contacted by said enlargement and to be forced out of position by the passage of said enlargement through said aperture and guide means adapted to guide said enlargement to and through said aperture, said guide means including an extension on said keeper beyond said enlargement and a plate member spaced from said latch supporting base having an aperture therein, said last named aperture being smaller than said first named aperture and being positioned and adapted to be penetrated by said keeper extension, said latch base including a horizontal plate portion having two side plate portions arranged generally in a U-shape, said plate member being arranged between said side plates, said plate member being secured at one end to the inside of said horizontal plate portion and having its other end supported in slidable engagement with one of said side plates at a point spaced along said side plate from said horizontal plate portion.

References Cited in the file of this patent

UNITED STATES PATENTS

| | | |
|---|---|---|
| 1,080,792 | Tueckmantel | Dec. 9, 1913 |
| 1,690,655 | Weymann | Nov. 6, 1928 |
| 2,211,217 | Peterson | Aug. 13, 1940 |
| 2,211,829 | Krause | Aug. 20, 1940 |
| 2,622,907 | Hynes | Dec. 23, 1952 |

FOREIGN PATENTS

| | | |
|---|---|---|
| 300,411 | Great Britain | Nov. 15, 1928 |